United States Patent [19]

Sick et al.

[11] 3,752,999

[45] Aug. 14, 1973

[54] READING APPARATUS FOR OPTICALLY DISCERNIBLE CHARACTERS

[75] Inventors: Erwin Sick, Jcking; Gernot Pinior, Germering; Johan Plöckl, Unterhaching, all of Germany

[73] Assignee: Zellweger AG Apparate-Und Maschinenfabrik, Uster, Switzerland

[22] Filed: Jan. 28, 1972

[21] Appl. No.: 221,702

[30] Foreign Application Priority Data

Mar. 22, 1971 Switzerland ........................ 4237/71

[52] U.S. Cl. .......... 250/219 D, 178/7.6, 250/219 Q, 250/223, 350/7

[51] Int. Cl... G01n 21/30, G02b 17/00, G06m 7/00

[58] Field of Search ................. 250/219 D, 219 CR, 250/219 Q, 239, 234, 219 QA, 223; 235/61.11 E; 178/7.6; 350/7, 285

[56] References Cited

UNITED STATES PATENTS 2,976,362 3/1961 Stamps ................................ 178/7.6

3,062,965 11/1962 Sick .................................. 350/7 X

*Primary Examiner*—James W. Lawrence
*Assistant Examiner*—T. N. Grigsby
*Attorney*—Werner W. Kleeman

[57] ABSTRACT

A reading apparatus for optically discernible characters, particularly optically discernible characters associated with an article and applied thereto or thereat comprising means for producing an optical transmitted light beam, a moved transmitted light beam directed towards a reference plane with regard to which the character to be read is arranged or moves within predetermined spatial limits departing from said transmitted light beam-producing means. Receiver means responsive to changes in the reflected light receive a light beam reflected by the character. The means for producing the transmitted light beam is arranged such that a surface or plane in which the transmitted beam moves prior to arriving at the character together with a perpendicular taken with regard to the reference plane encloses an angle which reduces specular reflections at the receiver means.

8 Claims, 2 Drawing Figures

PATENTED AUG 14 1973

3,752,999

SHEET 1 OF 2

READING APPARATUS FOR OPTICALLY DISCERNIBLE CHARACTERS

BACKGROUND OF THE INVENTION

The present invention relates to a new and improved reading apparatus or reader for optically discernible characters, and, in particular, relates to a reading apparatus for optically discernible characters associated with an article and preferably applied thereat or thereto. The term "article" as used herein is employed in its broadest sense to encompass different types of goods, wares, products or the like which can have information applied directly or indirectly thereto.

These characters can represent information associated with the relevant articles, preferably in coded form. For the purpose of reading-out such character, a transmitted beam of light is guided over the character, at which, depending upon the reflection capability of the location of the character which is momentarily scanned or impinged by the transmitted beam, a portion of such light beam is reflected. A received beam of light formed from at least a portion of the reflected light is delivered to an electro-optical receiver which then converts such received light beam into an electrical signal. This electrical signal can be transmitted in conventional manner to a processing device, typically a computer, and there evaluated. The result of this evaluation procedure can relate, for instance, to the price of the article, the introduction of this article price into a calculating installation, the determination of the sale of different articles, the article numbers of which are portrayed by coded characters, or quite generally can serve for controlling the storage or warehouse supply, just to mention a few noteworthy possibilities.

Constructions of reading mechanism have become known to the art which serve the purpose of reading-out characters present at articles. With this prior art equipment, a light beam which is guided over a character which is moving past impinges at a right angle to the plane of the character. Now, if the surface of the articles or its package, at which the character has been applied or printed, is glossy, or if for instance the article is additionally covered with a transparent plastic foil, then, specular or mirror reflections can arise which prevent the correct read-out of the character.

SUMMARY OF THE INVENTION

Hence, from what has been expressed above, it should be apparent that the art is still in need of a reading apparatus for optically discernible characters which is not associated with the aforementioned drawbacks and limitations of the prior art constructions. It is therefore a primary object of this invention to satisfactorily fulfill such need with a new and improved construction of such type character reader.

Still a further significant object of the present invention relates to a new and improved construction of reading apparatus for optically discernible characters which is extremely simple in design and construction, economical to manufacture, not readily susceptible to breakdown, requires minimum maintenance, and servicing, and importantly provides for extremely reliable, accurate and efficient character read-out.

Another extremely significant object of the present invention relates to a new and improved construction of reader or reading mechanism for optically discernible characters wherein specular reflected light remains extensively uninfluenced at the character itself or at the surface at which the character is applied or at a specular or mirror reflecting transparent enclosure of the article.

Now, in order to implement these and still further objects of the invention, which will become more readily apparent as the description proceeds, the inventive reading apparatus for optically discernible characters, particularly characters which are associated with an article and applied thereto, comprises means producing the optical transmitted beam and from which departs a moving transmitted light beam which is directed toward a reference plane with respect to predetermined spatial boundaries thereof within which the character is arranged or moves. A received bundle of light reflected by the character arrives at a receiver responsive to changes in the reflected light. Now according to important aspects of the invention, the aforesaid means producing the transmitted beam of light is designed and arranged in such a manner that that surface within which the transmitted beam of light moves prior to impinging upon the character together with a perpendicular taken with regard to the reference plane encloses an angle which reduces the specular reflection at the receiver.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
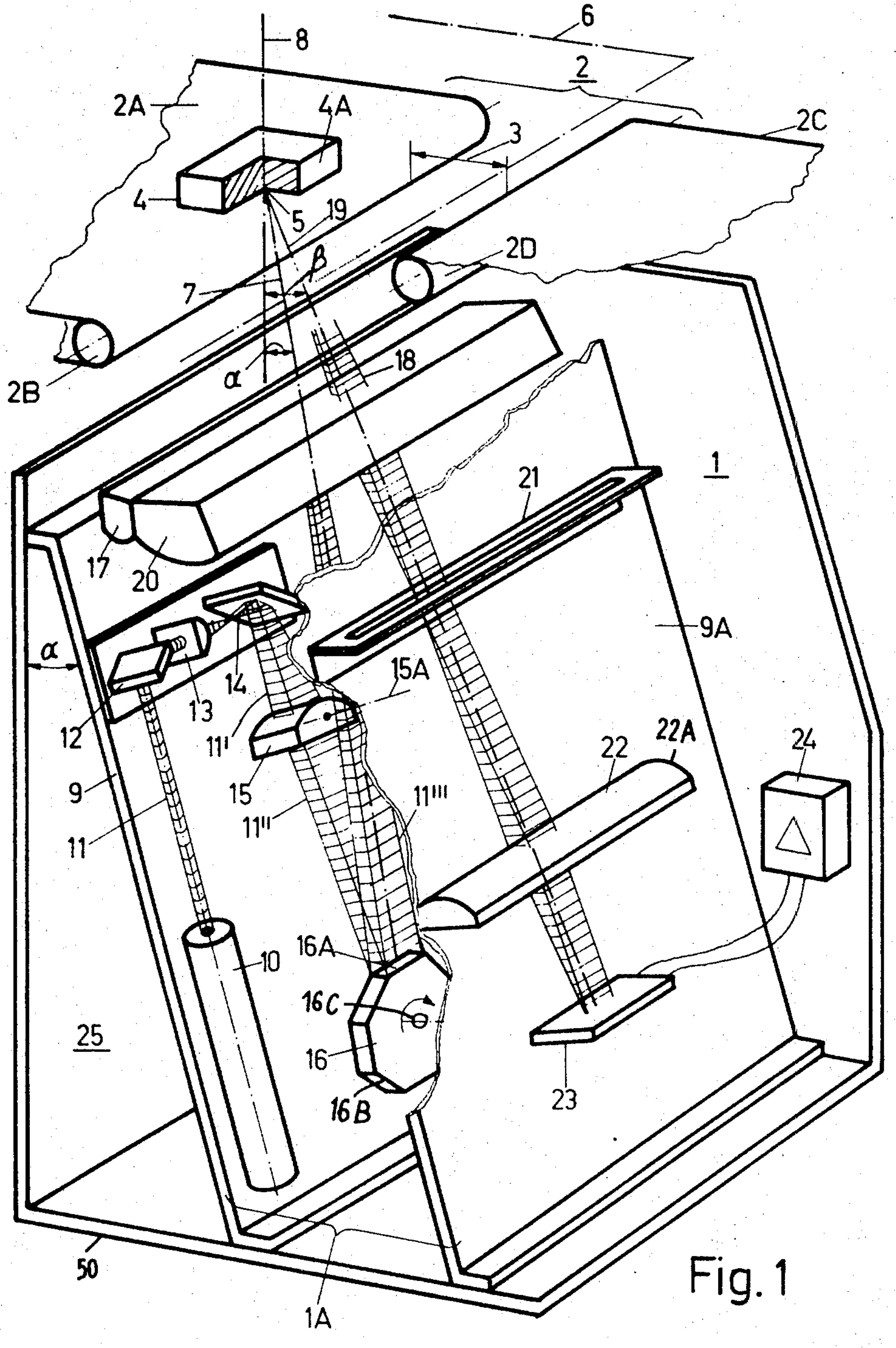
FIG. 1 is a simplified perspective view of a first embodiment of inventive reader or reading apparatus for optically discernible characters wherein part of the components have been cutaway for the purpose of exposing internal structure.

Describing now the drawings, in FIG. 1 there is illustrated in simplified perspective view an exemplary embodiment of inventive reader or reading apparatus for optically discernible characters wherein a portion of the components have been omitted or cutaway for the purpose of exposing internal structure and preserving clarity in illustration and understanding of the underlying concepts of this invention. Furthermore, in the representation of FIG. 1, a few of the individual components have only been schematically shown so as to preserve clarity in the drawing representation. Further, it is to be understood that the depicted reader has not been illustrated to scale.

Turning attention now then more specifically to FIG. 1, the reader or reading apparatus 1 is arranged, for instance, beneath an article conveying or conveyor mechanism 2 equipped with a gap or space 3. In the embodiment under consideration, the conveyor mechanism 2 comprises, for instance, a conveyor belt or band 2A traveling over a roller or roll 2B as well as a conveyor belt or band 2C which travels over a further roll or roller 2D, the last-mentioned roller only being partially illustrated. Between the rollers 2B and 2D and between the conveyor bands or belts 2A and 2C which are trained over these rollers there appears the aforesaid gap or space 3. Now the reading apparatus 1 is effective through this gap or space 3 and acts upon a character 5 applied to an article 4 conveyed on this conveyor mechanism 2, the character 5 preferably being applied to the bottom or underface of article 4. Instead of resorting to the use of an automatic article conveying mechanism 2, it would also be possible, of course, to guide the individual articles 4 manually over the gap or space 3.

Now such character 5 can advantageously comprise a conventional coded character consisting of concentric circles for instance. By means of this coded character 5 it is possible to indicate any relevant information, for instance the price of the article 4 and/or its article number or further appropriate data, such as weight, dimensions, the latest permissible date of sale, and so forth. Moreover, this character 5 could also be applied, for instance, in the form of a bar code at a side surface 4A of the article 4, as described for instance in the commonly assigned copending United States application, Ser. No. 221,241 filed Jan. 27, 1972, and entitled "METHOD AND APPARATUS FOR TRANSFORMING AN ANALOGUE SIGNAL INTO A BINARY SIGNAL".

Now in the ideal situation, the character 5 is located in a reference plane 6 during such time as it is scanned or readout. This reference plane 6 has been indicated schematically in FIG. 1 by the phantom lines or chain-dot border. Furthermore, in the exemplary embodiment under consideration, this reference plane 6 has been assumed to be horizontally disposed. However, it could also possess an inclined positional orientation. Since, as a practical matter, it is not readily possible to insure that the character 5 will always be arranged or moved exactly in the reference plane 6 in front of the reading apparatus 1, such reader is advantageously designed such that within a spatial tolerance range or zone associated with the reference plane 6 it insures for a sufficiently defined optical scanning for the character 5 with regard to the structure of such character.

According to the invention, the reading apparatus and its means 1A producing the transmitted light beam is arranged and constructed such that a transmitted beam of light 7 forms an angle $\alpha$ with respect to a perpendicular 8 taken with regard to the reference plane 6, this angle $\alpha$ reducing the specular or mirror reflection at a receiver component.

With the embodiment under consideration, the optical components still to be described, are secured to a base plate 9 which, in turn, at least approximately likewise encloses an angle $\alpha$ with respect to the perpendicular or normal 8 taken with regard to the reference plane 6. Consequently, there is insured for a particularly simple construction of the optical system as well as a rather good utilization of the space which is available beneath the conveyor mechanism 2, as such will be considered more fully herein.

Continuing, in the exemplary embodiment of FIG. 1, there is advantageously employed as the light source for the transmitted beam of light, a laser 10, for instance a helium gas laser. This laser 10 is mounted upon the base plate 9 and can be exactly positionally adjusted by any suitable conventional means. The bundle of light or beam 11 which is practically almost parallel and which departs from an end face of the laser 10, is delivered through the agency of a first deflecting mirror 12 to a first lens member 13. Owing to the presence of the first lens member 13, and the further deflecting mirror 14 there is present a divergent beam of light 11' which is transmitted to a second lens member 15, leaving such second lens member 15 in the form of a converging beam of light 11'' in the direction of a beam deflecting mechanism 16.

At this point it is to be remarked that the deflection of the direction of the light beam 11 via the deflecting mirrors 12 and 14 is not an absolute requirement. This arrangement, on the other hand, is advantageous in order to obtain the length of the light beam required for optical reasons when working with relatively small dimensions of the reading apparatus 1. Similarly, it is not an absolute requirement of the invention to use the lens members 13 and 15. However, if the character 5 which is to be read-out possesses a very fine structure or make-up and if the bundle of light 11 which departs from the light source, the laser 10 for instance, does not possess a sufficiently fine or parallel arrangement, then, such lens arrangement or an equivalent lens arrangement can be advantageous for producing a particularly fine scanning spot or a thin scanning trace upon the character 5.

Furthermore, it is advantageous to slightly incline at least one of the deflecting mirrors 12 and 14, for instance through several angular degrees with regard to a perpendicular taken with respect to the base plate 9. By so doing, it is possible to achieve the effect that the bundle of light beams 11' and 11'' will extend at an inclination away from the base plate 9 and will distance themselves therefrom, so that with the mirror or reflecting surface 16A of the beam deflecting mechanism 16 disposed perpendicular to the base plate, the light beam 11''' reflected therefrom will be guided so as to move past the lens member 15 and the deflecting mirror 14 which are otherwise in the way. This beam deflecting mechanism 16 may comprise a reflecting wheel or oscillating mirror, as generally indicated by reference character 16B in FIG. 1 and is shown located at the lower region of the components producing the transmitted light beam. Further, the drive for the beam deflecting mechanism, only the shaft 16c of which is visible in FIG. 1, may be located in the corner compartment 25 formed by the inclined base plate 9 and reader housing 50. This compartment 25 may accommodate other electronic components of the reader if desired. Further, it is here remarked that a cover wall 9A is provided for covering the side of the transmitted light beam-producing means 1A. This cover wall 9A carries at its outside surface the components of the receiver means as will be fully considered and is situated opposite the base plate or mounting wall 9 carrying the optical components of the aforesaid means 1A.

The light beam 11''' is directed towards a third lens member 17 arranged in the direction of the gap or space 3, in other words parallel to the rollers 2B and 2D, as shown. This third lens member 17 is advantageously in the form of a cylinder or cylindrical lens member, the length of which is at least equal to the scanning amplitude of the light beam 11''' at the location of lens member 17. This lens member 17 functions as the transmitting lens. The transmitted light beam 7 departs from the narrow side of the means 1A producing the transmitted light beam and which narrow side is defined by a surface of such third lens member 17. The transmitted beam 7 is focused at the reference plane 6. Now according to the arrangement of FIG. 1, the boundary surface of a schematically depicted article 4 at which there has been applied the optically discernible character 5 which is to be read-out is located at the reference plane 6 or within predetermined spatial boundaries or limits externally of such reference plane 6. The aforementioned article boundary surface can advantageously horizontally be disposed. Yet, owing to the inclined incidence of the transmitter light beam 7, it would be also permissible to have an inclined position of the aforementioned boundary surface within predetermined limits.

The scanning operation takes place in such a manner that the light beam or bundle 11''' coming from the beam deflecting mechanism 16, for instance in the form of a rotating reflector or mirror wheel, periodically moves across the narrow side of the third lens member 17, which narrow side confronts the beam deflecting mechanism 16.

Owing to focusing of the transmitted beam 7 at the reference plane 6, this transmitted beam produces a fine scanning trace at a character 5 arranged at that location.

The described arrangement for producing the transmitted beam 7 and with advantageously selected optical data for all practical purposes, insures for a sufficient depth of focus or definition depth. The transmitted beam 7, during scanning, moves in a surface which is inclined at an angle $\alpha$ with respect to the perpendicular taken with regard to the reference plane 6. To avoid disturbing specular reflections, the angle $\alpha$ is chosen, for instance, to be in the order of magnitude of 10° to 30°, preferably 15°. It is however also possible to select an even greater value for the angle $\alpha$, for instance 45°, whereby there is then realized the further advantage that the plane of the character 5 can be inclined within a relatively great predetermined angular range with regard to the reference plane 6 without thereby impairing positive read-out thereof.

With parallel position of the character 5 with respect to the reference plane 6, mirror or specular reflected light will be reflected back at an angle-$\alpha$ with respect to the perpendicular 8 to the reference plane 6, and such reflected light will neither be reflected back to the transmitter beam 7 nor will it be reflected or projected towards the receiver.

A received bundle of light 18 is formed from the light which is essentially diffusely reflected by the scanned surface of the article 4 and its character 5. This received bundle of light 18 has a main beam or ray 18 which extends at an angle $\beta$ with respect to the perpendicular 8 taken with regard to the reference plane 6. The angle $\beta$ is larger than the angle $\alpha$. The disturbance possibilities which are brought about by the specular reflections are thus further reduced so that also with relatively inclined arrangement of the optically discernible character 5 with respect to the reference plane 6 there is still insured for a relatively reflection free read-out.

This received bundle of light or light beam 18 is directed towards a fourth lens member 20 which functions as a receiving or receiver lens. This fourth lens member 20, likewise preferably in the form of a cylindrical lens, is arranged parallel to the third lens member 17, as shown. Between this third lens member 17 and the fourth lens member 20, there is advantageously arranged a light absorbing layer in order to prevent transfer of light from the transmitted light beam into the received light beam.

The received light beam 18 is delivered from the fourth lens member 20 preferably through a diaphragm 21 and preferably through an image reproducing mechanism 22, for instance a further lens or a hollow mirror 22A, to a photoelectric receiver or receiver mechanism 23, for instance a photomultiplier.

An electrical output signal of the photoelectric receiver 23 can be delivered to an amplifier 24 before it is delivered in conventional fashion to a processing device, for instance a computer for evaluation.

Figure 2:
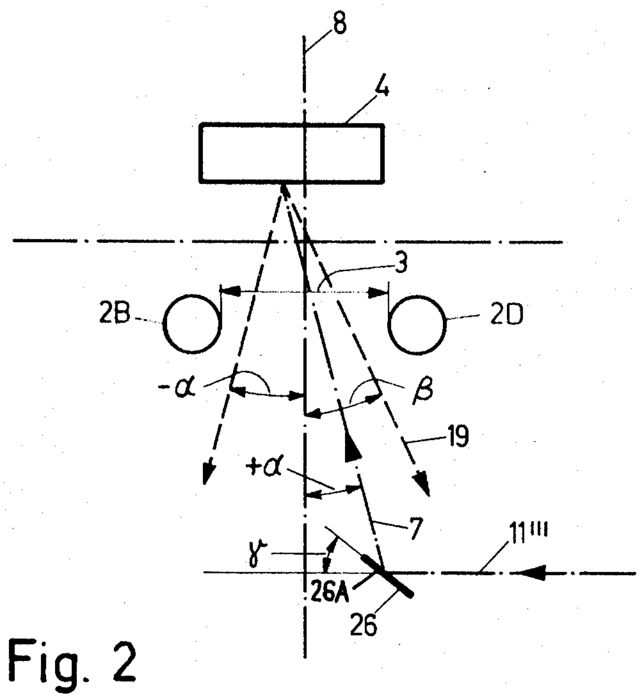
FIG. 2 is a sectional view taken through the longitudinal symmetrical plane of a second exemplary embodiment of inventive reading mechanism for the purpose of illustrating a further possibility of producing the transmitted beam.

Considering now FIG. 2 there is depicted therein a further exemplary embodiment of the invention. In particular, this Figure illustrates a section through the lengthwise symmetrical plane of the inventive reading or read-out mechanism and it depicts a further possibility for guiding the light beam into the means producing the transmitted beam. According to this exemplary embodiment the means producing the transmitted beam 7 and the mounting plate 9 are horizontally arranged. Consequently, the light beam 11''' in this case extends at least approximately horizontally. In order to generate a transmitted beam 7, which is inclined with regard to the perpendicular 8 taken with respect to the reference plane 6 by the angle $\alpha$, there is provided a beam deflecting mechanism 26. This beam deflecting mechanism 26 can be, for instance, a narrow long mirror 26A which is arranged parallel to the axis of the third and fourth lens members 17, 20. Instead of using a mirror it would also be possible to use an optical prism. The reflecting surface of this beam deflecting mechanism 26 is thus inclined by the angle $\gamma$ towards the horizontal, wherein $\gamma = 90° - \alpha/2$.

While there is shown and described present preferred embodiments of the invention, it is to be distinctly understood that the invention is not limited thereto but may be otherwise variously embodied and practiced within the scope of the following claims. Accordingly,

What is claimed is:

1. A reading apparatus for optically discernible characters, particularly optically discernible characters associated with an article and applied thereto or thereat, comprising means for producing an optical transmitted light beam, said producing means incorporating means for generating a moved transmitted light beam directed towards a reference plane with regard to which the character to be read is arranged or moves within predetermined spatial limits departing from said transmitted light beam-producing means, receiver means responsive to changes in the reflected light for receiving a light beam reflected by the character, said means for producing the transmitted light beam being arranged such that a surface in which the transmitted beam moves prior to arriving at the character together with a perpendicular taken with regard to the reference plane encloses an angle which reduces specular reflections at said receiver means, said means producing the transmitted light beam being closed at the beam exit location by a cylindrical lens member functioning as a transmitting lens, the length of which is at least equal to the scanning amplitude at the location of said cylindrical lens member, and an additional lens member defining a receiving lens located at a narrow side of the beam exit location, said additional lens member extending at a larger angle relative to the perpendicular taken with regard to the reference plane than said angle enclosed by said transmitted light beam, the length of said additional lens means being at least substantially equal to the scanning amplitude.

2. The reading apparatus as defined in claim 1, wherein said additional lens member is a cylindrical lens.

3. A reading apparatus for optically discernible characters, particularly optically discernible characters associated with an article and applied thereto or thereat, comprising means for producing an optical transmitted light beam, said producing means incorporating means for generating a moved transmitted light beam directed towards a reference plane with regard to which the character to be read is arranged or moves within predetermined spatial limits departing from said transmitted light beam-producing means, receiver means responsive to changes in the reflected light for receiving a light beam reflected by the character, said means for producing the transmitted light beam being arranged such that a surface in which the transmitted beam moves prior to arriving at the character together with a perpendicular taken with regard to the reference plane encloses an angle which reduces specular reflections at said receiver means, said means producing said transmitted light beam possesses a mounting wall arranged at least substantially at said enclosed angle with respect to the perpendicular taken with regard to said reference plane, said transmitted light beam-producing means embodying optical elements secured to said mounting wall.

4. The reading apparatus as defined in claim 3, further including a cover wall for covering the side of said means producing the transmitted light beam and which is situated opposite said mounting wall.

5. The reading apparatus as defined in claim 4, wherein said receiver means embodies components secured to the outside of said cover wall.

6. A reading apparatus for optically discernible characters, particularly optically discernible characters associated with an article and applied thereto or thereat, comprising means for producing an optical transmitted light beam, said producing means incorporating means for generating a moved transmitted light beam directed towards a reference plane with regard to which the character to be read is arranged or moves within predetermined spatial limits departing from said transmitted light beam-producing means, receiver means responsive to changes in the reflected light for receiving a light beam reflected by the character, said means for producing the transmitted light beam being arranged such that a surface in which the transmitted beam moves prior to arriving at the character together with a perpendicular taken with regard to the reference plane encloses an angle which reduces specular reflections at said receiver means, and a deflecting member for deflecting the transmitted light beam prior to its departure out of said means producing the transmitted light beam and into a surface which encloses together with the perpendicular taken with regard to the reference plane an angle which reduces the specular reflections at the receiver means.

7. A reading apparatus for optically discernible characters, particularly optically discernible characters associated with an article and applied thereto or thereat, comprising means for producing an optical transmitted light beam, said producing means incorporating means for generating a moved transmitted light beam directed towards a reference plane with regard to which the character to be read is arranged or moves within predetermined spatial limits departing from said transmitted light beam-producing means, receiver means responsive to changes in the reflected light for receiving a light beam reflected by the character, said means for producing the transmitted light beam being arranged such that a surface in which the transmitted beam moves prior to arriving at the character together with a perpendicular taken with regard to the reference plane encloses an angle which reduces specular reflections at said receiver means, a housing, said means producing said transmitted light beam incorporating an inclined member forming together with said housing a corner compartment, said generating means including driven beam deflecting means for the deflection of the transmitted light beam, said beam deflecting means being arranged near the lower region of said inclined member, the drive for said driven beam deflecting means being at least partially accommodated at said corner compartment.

8. The reading apparatus as defined in claim 7, wherein said corner compartment is capable of accommodating electronic components of the reading apparatus.

* * * * *